Patented Dec. 24, 1946

2,413,275

UNITED STATES PATENT OFFICE 2,413,275

POLYVINYL ACETAL MALEATES AND METHOD OF MAKING SAME

Frank E. Wilson, Ashland, Gustavus J. Esselen, Swampscott, and Gaetano F. D'Alelio, Northampton, Mass., assignors, by mesne assignments, to Pro-Phy-Lac-Tic Brush Company, Northampton, Mass., a corporation of Delaware No Drawing. Application August 27, 1943, Serial No. 500,278

7 Claims. (Cl. 260—73)

The present invention relates to a novel synthetic material and to a process of making the same. It is based on the discovery that when a polyvinyl alcohol is condensed with an aldehyde in the presence of maleic acid, preferably in the form of maleic anhydride, and in a substantially anhydrous medium and under conditions such that the polyvinyl alcohol and the final product are always in the solid state and the water formed by the reaction is removed from the reaction zone, the maleic acid not only acts as a catalyst for the acetal reaction but also as a reactant so that there is produced what may be called a polyvinyl acetal maleate.

Determination of the acid and saponification numbers of the resulting products indicates that there are present in the final product uncombined free carboxyl groups, also that some of the dicarboxylic acid groups have formed a ring while others have formed a bridge or cross-linkage. These tests indicate that in one portion of the molecule only one of the carboxyl groups reacts with an hydroxyl group of the polyvinyl alcohol while in another part of the molecule both of the carboxyl groups have reacted with one polyvinyl alcohol chain producing a ring structure, and that in another part of the molecule both carboxyl groups have reacted with two polyvinyl alcohol chains producing a bridge structure.

Such a material may be represented as containing the following five residues:

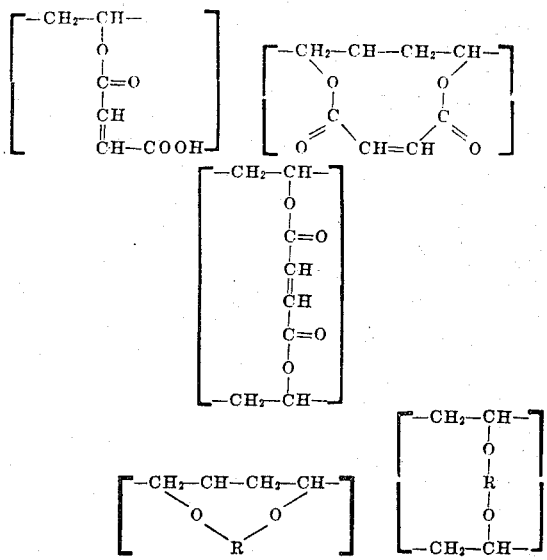

where R is an alkylene or arylene radical.

The final product retains the double bonds of the acyl radical of the component maleic acid, and therefore may be capable of reaction with other substances with valuable results.

We are aware that it has been proposed to copolymerize monomeric vinyl methyl formal (which is a mixed methyl vinyl acetal of formaldehyde) with maleic anhydride, but this causes the disappearance of the double bonds and the molecule contains no ester groups. We are also aware that it has been proposed to copolymerize a vinyl ester and a maleic dimethyl ester with the disappearance of the double bonds of the maleic acid, then saponify the resulting product to produce a polyvinyl alcohol containing carboxyl groups derived from maleic acid and finally acetalize with an aldehyde. This product can be described as containing residues of polyvinyl acetal and residues of maliec anhydride or acid, but contains no ester groups and the double bond of the maleic acid has disappeared. In contrast, the present process is the esterification and acetalization of previously formed polymers and results in a product containing ester groups of polyvinyl alcohol and maleic acid and retains the double bonds of maleic acid.

The copending application of Joseph Dahle Serial No. 343,439, filed July 1, 1940, describes the treatment of a filament of polyvinyl alcohol with an aldehyde in the presence of maleic anhydride and water. In this reaction, the maleic anhydride acts solely as a catalyst and does not form an ester with the polyvinyl alcohol.

The novel products described herein and produced by our novel processes are characterized by different solubility characteristics from similar products made by known processes, and, notwithstanding the large amount of cross linkage, may be hot molded under relatively high temperatures and pressures. For instance, it is possible to hot mold the product made with maleic anhydride as described hereafter under temperatures of from 130° to 150° C, and pressures of from 5000 to 10,000 lbs. per square inch. This is exceptional when one considers that a crosslinked copolymer of approximately 99 to 99.5 parts of vinyl acetate and 0.5 to 1 part of di-allyl maleate, which acts as a cross linking agent, cannot be successfully molded, although the amount of the cross linking agent is extremely small. In the new maleic anhydride product herein described, the percentage of the cross linking component as shown by the saponification numbers is very much larger yet it is possible to hot mold the product successfully.

The novel products herein described are made by treating a solid polyvinyl alcohol with maleic acid or its equivalent anhydride and an aldehyde simultaneously. This is done preferably in a volatile liquid which is a non-solvent for the polyvinyl alcohol and for the resulting final product and is not miscible with water. A part at least of the reaction is carried out at or above the vaporization temperature of the reaction mixture so that the water formed by the reaction is removed from the zone of the reaction and carried off with the vapors of the non-solvent liquid. In practice, it is convenient to condense the vapors to separate the water from the distillate and return the distillate to the reaction chamber. This process has the advantage that the polyvinyl alcohol and the resultant product are in the solid state throughout the process, and, therefore, it is not necessary to dissolve the polyvinyl alcohol, or precipitate the product from a solution.

The term "a polyvinyl alcohol" is used herein to include pure polyvinyl alcohol or polyvinyl materials containing unreacted hydroxyl groups, for instance, a partially esterified polyvinyl alcohol, a partial polyvinyl acetal or the hydrolyzed interpolymer of vinyl chloride and vinyl acetate, etc.

Various inert liquids may be employed. We prefer to use inert hydrocarbons such as benzene, heptane, octane and mixed hydrocarbon fractions, etc., it being requisite that the liquid be a non-solvent for the polyvinyl alcohol and for the resulting acetal, and that it be immiscible with water, and preferably miscible with the aldehyde and catalyst.

The polyvinyl alcohol or other polyvinyl substance may be in different solid forms, such for instance, as a powder, a filament, a sheet, a rod or a tube. Filaments are polyvinyl alcohol which have been stretched to increase the tensile strength and fabric woven therefrom may be treated as described without great loss of tensile strength. Such filaments or cloth retain their original softness and flexibility to a high degree.

The invention will be fully understood from the following examples which are given as illustrations of the way the novel process may be practiced and the product produced.

Example 1

| | | |
|---|---|---|
| Powdered polyvinyl alcohol | grams | 44 |
| Heptane | cubic centimeters | 700 |
| Paraformaldehyde | grams | 30 |
| Maleic anhydride | do | 5 |

The heptane and polyvinyl alcohol were heated, with stirring, to 70° C. The maleic anhydride was melted and added to the mixture. The heating was continued for 15 minutes then the paraformaldehyde was added and the mixture heated in a vessel equipped with a reflux condenser and a water trap. During the continued heating, the water as it was produced by the reaction was vaporized with the heptane and was then condensed and caught in the trap while the condensed heptane was returned to the reaction vessel. In this way, the water produced by the reaction was removed from the reaction bath and prevented from combining in substantial amounts with the unreacted polyvinyl alcohol. The heating as described was continued for two and one-half hours, after which the polyvinyl acetal was separated by filtering and was washed and neutralized to remove any traces of uncombined maleic acid.

Example 2

| | | |
|---|---|---|
| Powdered polyvinyl alcohol | grams | 44 |
| Heptane | cubic centimeters | 700 |
| Paraformaldehyde | grams | 30 |
| Maleic anhydride | do | 5 |
| Reaction temperature | °C | 84–95 |
| Reaction time | hours | 2.5 |

The procedure was otherwise as in Example 1.

The product analyzed 21.1 percent unreacted hydroxyl groups calculated as vinyl alcohol. The acid number was 14 and the saponification number was 25. The per cent of acetal was 73.8, and the degree of reaction 95.6.

Example 3

| | | |
|---|---|---|
| Powdered polyvinyl alcohol | grams | 44 |
| Heptane | cubic centimeters | 500 |
| Butyraldehyde | grams | 54 |
| Maleic anhydride | do | 5 |
| Reaction temperature | °C | 76 to 87.5 |
| Reaction time | hours | 3 |

Acid number 17; saponification number 31; vinyl alcohol 11.7; acetal 82.0; degree of reaction 84.5.

Example 4

| | | |
|---|---|---|
| Powdered polyvinyl alcohol | grams | 44 |
| Heptane | cubic centimeters | 500 |
| Crotonaldehyde | grams | 52.5 |
| Maleic anhydride | do | 5 |
| Reaction temperature | °C | 81 to 92 |
| Reaction time | hours | 3 |

Acid number 23; saponification number 50; vinyl alcohol 38.1; acetal 52.1; degree of reaction 56.7.

Example 5

| | | |
|---|---|---|
| Powdered polyvinyl alcohol | grams | 44 |
| Heptane | cubic centimeters | 600 |
| Furfuraldehyde | grams | 72 |
| Maleic anhydride | do | 5 |
| Reaction temperature | °C | 78 to 94.5 |
| Reaction time | hours | 3 |

Acid number 9; saponification number 59; vinyl alcohol 74.3; acetal 16; degree of reaction 56.7.

Example 6

| | | |
|---|---|---|
| Powdered polyvinyl alcohol | grams | 44 |
| Heptane | cubic centimeters | 500 |
| Benzaldehyde | grams | 79.5 |
| Maleic anhydride | do | 5 |
| Reaction temperature | °C | 88 to 95.5 |
| Reaction time | hours | 3 |

Acid number 17; saponification number 58; vinyl alcohol 16.2; acetal 73.4; degree of reaction 51.2.

Example 7

| | | |
|---|---|---|
| Powdered polyvinyl alcohol | grams | 44 |
| Varnoline (a heavy benzine) | cubic centimeters | 500 |
| Paraformaldehyde | grams | 22.5 |
| Maleic anhydride | do | 5 |
| Reaction temperature | °C | 70 to 148 |
| Reaction time | minutes | 70 |

Acid number 8; saponification number 57; vinyl alcohol 17.4; acetal 73.2; degree of reaction 90.0.

Example 8

| | | |
|---|---|---|
| Cloth woven from polyvinyl alcohol yarn | grams | 23 |
| Heptane | cubic centimeters | 1200 |
| Paraformaldehyde | grams | 15 |
| Maleic anhydride | do | 5 |
| Reaction temperature | °C | 84 to 90 |
| Reaction time | hours | 3 |

Example 9

| | |
|---|---|
| Cloth woven from polyvinyl alcohol yarn grams | 5 |
| Heptane cubic centimeters | 700 |
| Paraformaldehyde grams | 15 |
| Maleic anhydride do | 5 |
| Reaction temperature °C | 84 to 92 |
| Reaction time minutes | 75 |

Example 10

| | |
|---|---|
| Polyvinyl alcohol sheeting—thickness 0.004" grams | 15 |
| Heptane cubic centimeters | 500 |
| Paraformaldehyde grams | 15 |
| Maleic anhydride do | 5 |
| Reaction temperature °C | 86 to 91 |
| Reaction time hours | 1 |

Note.—The center of the sheet was not reacted.

Example 11

| | |
|---|---|
| Polyvinyl alcohol as a coating on cotton cloth, approximately grams | 15 |
| Heptane cubic centimeters | 1500 |
| Butyraldehyde grams | 75 |
| Maleic anhydride do | 5 |
| Reaction temperature °C | 85 to 91 |
| Reaction time hours | 3 |

It will be apparent from the above examples that the degree of reaction will depend in part at least on the temperature and time. In each instance the reaction was carried on under a reflux condenser with a trap for separation of the water, the condensed inert liquid being returned to the reaction mixture.

We claim:

1. In the process of acetalizing a solid polyvinyl compound containing repeating

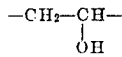

units with an aldehyde in an inert reaction medium whereby the polyvinyl compound and the resulting polyvinyl acetal remain in the solid state throughout the process, the improvement which consists in conducting the acetalization under anhydrous conditions and in the presence of a single catalyst selected from the group consisting of maleic acid and maleic anhydride, the maleic compound also acting simultaneously as an esterifying agent.

2. In the process of acetalizing a solid polyvinyl compound containing repeating

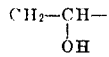

units with an aldehyde in an inert reaction medium whereby the polyvinyl compound and the resulting polyvinyl acetal remain in the solid state throughout the process, the improvement which, consists in conducting the acetalization under anhydrous conditions in the presence of maleic anhydride as the sole acetalization catalyst, the maleic anhydride also acting simultaneously as an esterifying agent.

3. The process of acetalizing a solid polyvinyl compound containing repeating

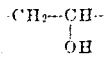

units which comprises heating such a polyvinyl compound in a liquid hydrocarbon in the presence of an aldehyde and a compound selected from the group consisting of maleic acid and maleic anhydride, and conducting the reaction under anhydrous conditions by removing water from the zone of the reaction, the maleic compound serving as the sole acetalization catalyst and also simultaneously as an esterifying agent thereby producing a polyvinyl acetal maleate which is not soluble in said hydrocarbon.

4. The process of acetalizing a solid polyvinyl compound containing repeating

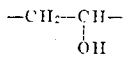

units which comprises heating such a polyvinyl compound in heptane in the presence of an aldehyde and a compound selected from the group consisting of maleic acid and maleic anhydride, and conducting the reaction under anhydrous conditions by removing water from the zone of the reaction, the maleic compound serving as the sole acetalization catalyst and also simultaneously as an esterifying agent thereby producing a polyvinyl acetal maleate which is not soluble in the heptane.

5. The process of acetalizing a solid polyvinyl compound containing repeating

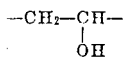

units which comprises heating such a polyvinyl compound in a liquid hydrocarbon in the presence of an aldehyde and maleic anhydride, and conducting the reaction under anhydrous conditions by removing water from the zone of the reaction, the maleic anhydride serving as the sole acetalization catalyst and also simultaneously as an esterifying agent thereby producing a polyvinyl acetal maleate which is not soluble in said hydrocarbon.

6. The process of acetalizing a solid polyvinyl compound containing repeating

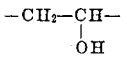

units which comprises heating such a polyvinyl compound in a liquid hydrocarbon in the presence of butyraldehyde and maleic anhydride, and conducting the reaction under anhydrous conditions by removing water from the zone of the reaction, the maleic anhydride serving as the sole acetalization catalyst and also simultaneously as an esterifying agent thereby producing a polyvinyl butyral maleate which is not soluble in said hydrocarbon.

7. In the process of acetalizing a polyvinyl compound containing repeating

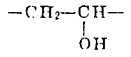

units with an aldehyde, the improvement which comprises conducting the acetalization under anhydrous conditions and in the presence of a single catalyst selected from the group consisting of maleic acid and maleic anhydride, the maleic compound also acting simultaneously as an esterifying agent.

FRANK E. WILSON.
GUSTAVUS J. ESSELEN.
GAETANO F. D'ALELIO.